United States Patent [19]
Asselin et al.

[11] Patent Number: 5,950,316
[45] Date of Patent: Sep. 14, 1999

[54] MANUAL CUTTING TOOL OF THE SECATEURS TYPE

[75] Inventors: Arnaud Asselin; Alain Foucher, both of Baugé, France

[73] Assignee: Deville Sa Secateurs Pradines, France

[21] Appl. No.: 08/842,285

[22] Filed: Apr. 23, 1997

[30]     Foreign Application Priority Data

Apr. 25, 1996 [FR] France .................................. 96 05300

[51] Int. Cl.⁶ ..................................................... B26B 13/00
[52] U.S. Cl. .................................... 30/257; 30/254; 30/26
[58] Field of Search ............................ 30/254, 257, 197, 30/199

[56]     References Cited

U.S. PATENT DOCUMENTS

| | | |
|---|---|---|
| 2,632,245 | 3/1953 | Garmo . |
| 3,143,799 | 8/1964 | Gover ..................................... 30/257 X |
| 3,175,281 | 3/1965 | Nardo ..................................... 30/257 X |
| 3,596,355 | 8/1971 | Wertepny . |
| 3,839,794 | 10/1974 | Deale . |
| 5,074,046 | 12/1991 | Kolesky . |

FOREIGN PATENT DOCUMENTS

| | | |
|---|---|---|
| 0394851 | 10/1990 | European Pat. Off. . |
| 2208328 | 6/1974 | France . |
| 2499358 | 8/1982 | France . |
| 718773 | 3/1942 | Germany . |
| 3916123 | 1/1990 | Germany . |
| 27620 | 4/1911 | United Kingdom . |
| 509078 | 7/1939 | United Kingdom . |

*Primary Examiner*—Douglas D. Watts
*Attorney, Agent, or Firm*—Banner & Witcoff, Ltd.

[57]     ABSTRACT

The two straight line segments respectively constituting the intersection of the holding plane, on the one hand, the cutting plane, on the other hand, and the plane containing the median axis of the members forming handles and perpendicular to the holding plane define between them a lateral inclination angle. Further, the projection of a median axis of the cutting edges onto the holding plane defines with the median axis of the members forming handles an angle of inclination in the holding plane.

12 Claims, 8 Drawing Sheets

FIG_8

FIG_9

FIG_1

PRIOR ART

FIG_2

FIG_3

FIG_4

FIG_5

FIG_6

FIG_7

FIG_10

FIG_11

FIG_12

FIG_13

FIG_14

Effect on cutting speed of leftward inclination of the blade

FIG_15

Effect on cutting speed of downward inclination of the blade

FIG_16

MANUAL CUTTING TOOL OF THE SECATEURS TYPE

BACKGROUND OF THE INVENTION

1. Field of the Invention

The present invention concerns a manual cutting tool of the secateurs type.

2. Description of the Prior Art

U.S. Pat. No. 2,632,245 discloses a tool of the above type comprising two arms adapted to pivot relative to each other about a pivot axis, scissors fashion, the two arms each including on the same side of the pivot axis a member forming a handle and on the other side of said axis a cutting member having a cutting edge, the two members forming handles being adapted to be held by a user in one hand in respective holding areas equivalent to straight line segments mobile relative to each other substantially in a holding plane when the two members forming handles are moved towards each other against the action of a spring to actuate the cutting tool or when said members forming handles are released, the cutting edges of the cutting members being equivalent, at least near their free end remote from the pivot axis, to straight line segments mobile relative to each other substantially in a cutting plane when the tool is actuated, the holding plane containing a median axis of the members forming handles, the two straight line segments respectively constituting the intersection of the holding plane, on the one hand, the cutting plane, on the other hand, and the plane containing said median axis and perpendicular to the holding plane defining between them a lateral inclination angle.

This lateral inclination angle improves the cutting position, removes the hand of the user from the working area and achieves easier and more efficient cutting than a conventional manual cutting tool of the secateurs type, in which the cutting plane and the holding plane are coincident, the pivot axis being perpendicular to this plane.

However, a tool of this kind cannot accommodate under the best possible conditions all the cutting situations encountered in reality when pruning a bush such as a rose or a vine.

Experience shows that the intensive use of a tool of this kind often still causes pain or pathological conditions due to the biomechanical stresses operating on the user's bone, muscle, ligament and nervous systems.

FR-A-2 208 328 discloses a tool of the above type in which a median axis of the cutting members is in the holding plane, in which it is inclined downwards relative to a median axis of the handles of said tool.

A tool construction of this kind improves the conditions of use of the tool.

The aim of the present invention is to remedy the aforementioned drawbacks of prior art manual cutting tools of the secateurs type and to propose a tool of the aforementioned type which is simpler and more efficient to use, requires less muscular effort and causes less pain and pathological conditions than a prior art cutting tool, in particular through ensuring that, in use, the active part of the tool constituted by the cutting members is naturally presented in a position as close as possible to the ideal position and the hand of the user is removed from the working area.

SUMMARY OF THE INVENTION

In accordance with the invention, in a manual cutting tool of the aforementioned type the projection of a median axis of the cutting edges onto the holding plane and the median axis of the members forming handles define an inclination angle in the holding or sagittal plane.

We have undertaken systematic tests which show, surprisingly and unexpectedly, that the combination of the aforementioned two inclinations of the median axis of the cutting edges relative to the median axis of the handles, respectively a lateral inclination and an inclination in the holding plane, have a synergetic effect producing better results than if only one of these two inclinations is used, both from the point of view of the comfort and the ease of cutting maneuvers and from the point of view of the cutting speed for reduced fatigue.

Other features and advantages of the invention will emerge from the following description.

BRIEF DESCRIPTION OF THE DRAWINGS

In the accompanying drawings, given by way of non-limiting example only.

DETAILED DESCRIPTION OF THE PREFERRED EMBODIMENTS

Figures 1, 9:
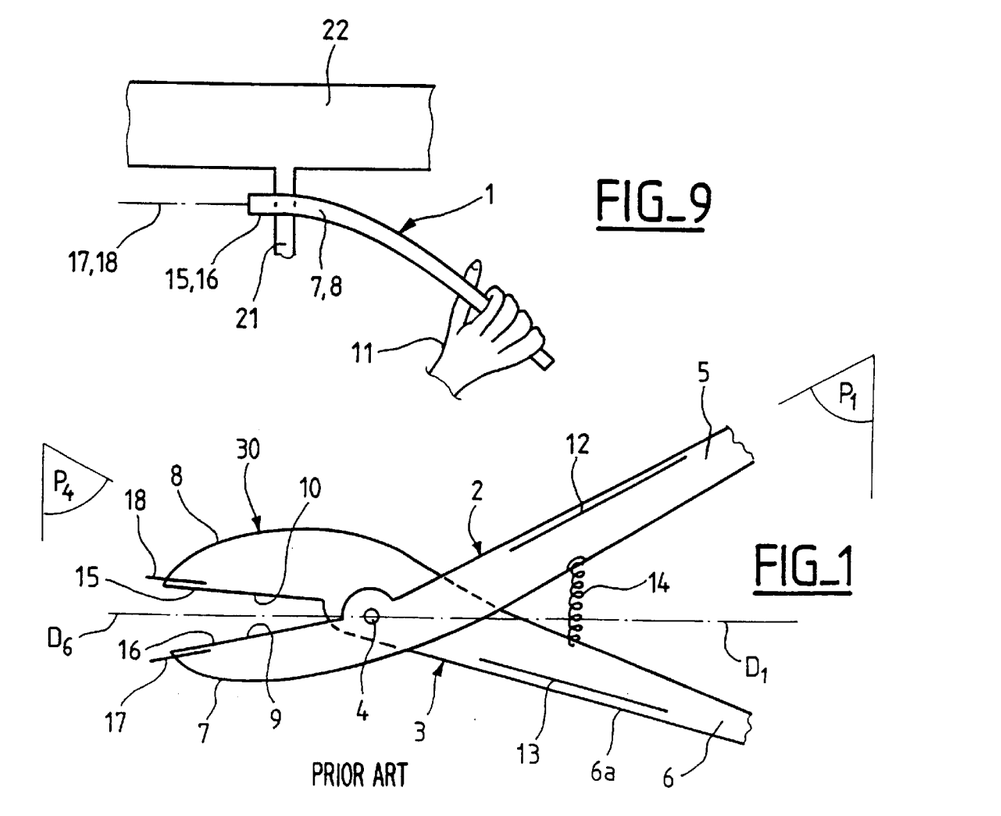
FIG. 1 is a diagrammatic view in elevation of a conventional manual cutting tool of the secateurs type.
FIG. 9 is a view equivalent to FIG. 8 of a variant of the tool from FIG. 8.

In the embodiment shown in FIG. 1, the conventional manual cutting tool 30 of the secateurs type comprises two arms 2, 3 pivoting relative to each other about a pivot axis 4, scissors fashion. The two arms 2, 3 each include on the same side of the pivot axis 4 a member 5, 6 forming a handle and on the other side of said axis 4 a cutting member 7, 8 having a cutting edge 9, 10. The two members 5, 6 forming handles are adapted to be held in one hand 11 by a user in respective holding areas equivalent to straight line segments 12, 13 moving relative to each other substantially in a holding plane P1 when the two members 5, 6 forming handles are moved towards each other against the action of a spring 14 to actuate the cutting tool 1 or when said members 5, 6 forming handles are released. The cutting edges 9, 10 of the cutting members 7, 8 are equivalent, at least near their free end 15, 16 remote from the pivot axis 4, to straight line segments 17, 18 moving relative to each other substantially in a cutting plane P4 when the tool 1 is actuated. The holding plane P1 contains a median axis D1 of the members 5, 6 forming handles.

In this embodiment, the holding plane P1 and the cutting plane P4 are coincident with the plane of the figure, the pivot axis 4 being perpendicular to these coincident planes P1, P4. The straight line segments 12, 13 are respectively substantially coincident with a top edge of the handle 5 and a bottom edge of the handle 6. The straight line segments 17, 18 are substantially coincident with the cutting edges 15, 16.

Figure 2:
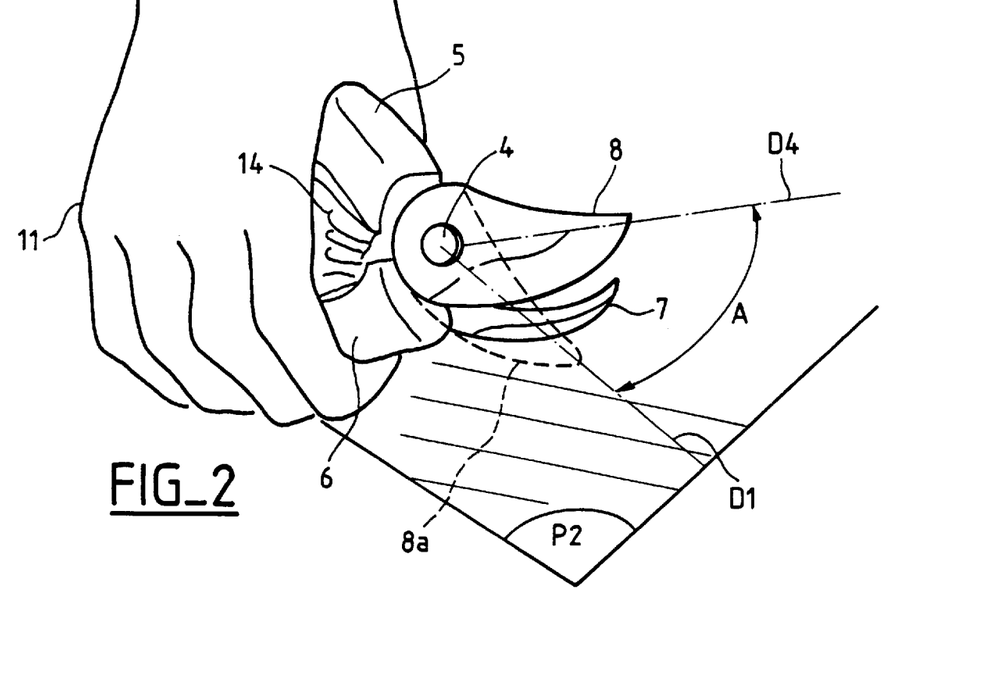
FIG. 2 is a diagrammatic perspective view of a manual cutting tool having a left-hand lateral inclination angle, the tool being held in the right hand.
Figure 4:
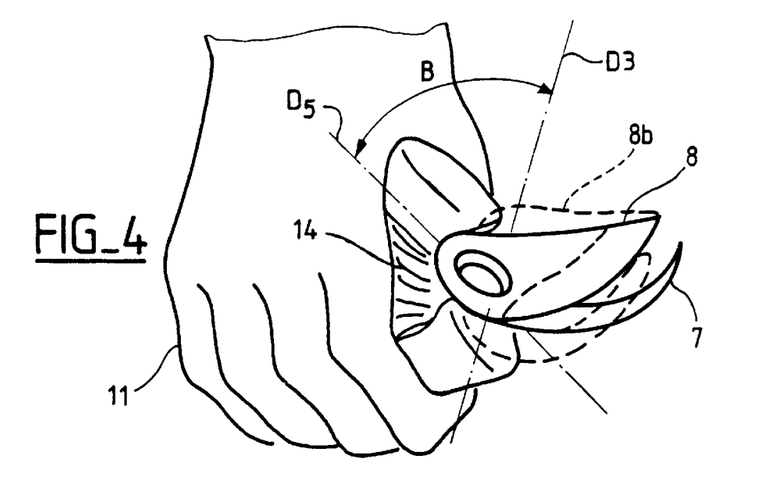
FIG. 4 is a view equivalent to FIG. 2 of a manual cutting tool having a different type of inclination.
Figure 6:
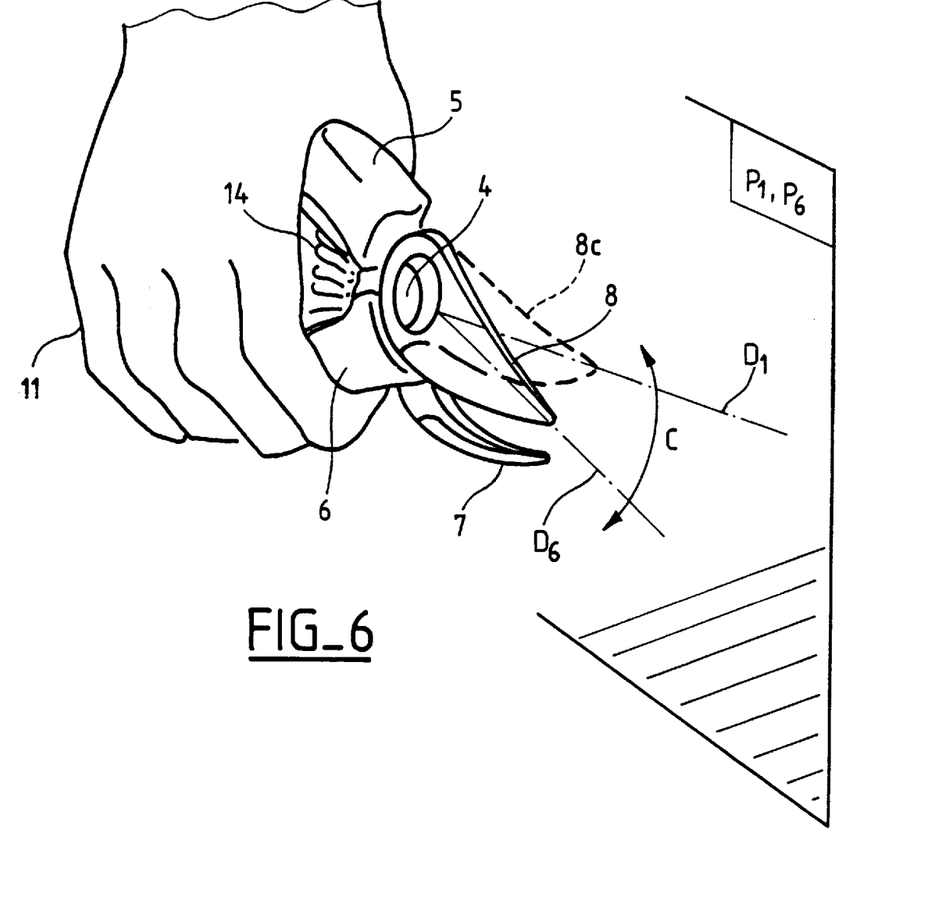
FIG. 6 is a view equivalent to FIG. 2 of a manual cutting tool having an inclination in the holding plane.

The cutting members are of any kind commonly known in the shear art. For example, the cutting members may consist of two blades, with sharpened edges facing each other, that act against each other to cut the material between them. Likewise, the cutting members could be two jagged-edged or toothed jaws which act against each other in a similar fashion as the blade edges when the holding members are compressed against each other. Any two edges that, when forced against each other, are capable of cutting material found between them can be used as the secateurs shear cutting edges. The cutting edges of the blades can be straight but they can equally well be curved, as shown in FIGS. 2, 4 and 6. In this case, the cutting edges 9, 10 are equivalent to straight line segments at least near their free end remote from the pivot axis 4 (see FIG. 9).

The same reference numbers and symbols are used hereinafter for all the members mentioned above that are used in the various embodiments of the present invention now to be described.

Figure 3:
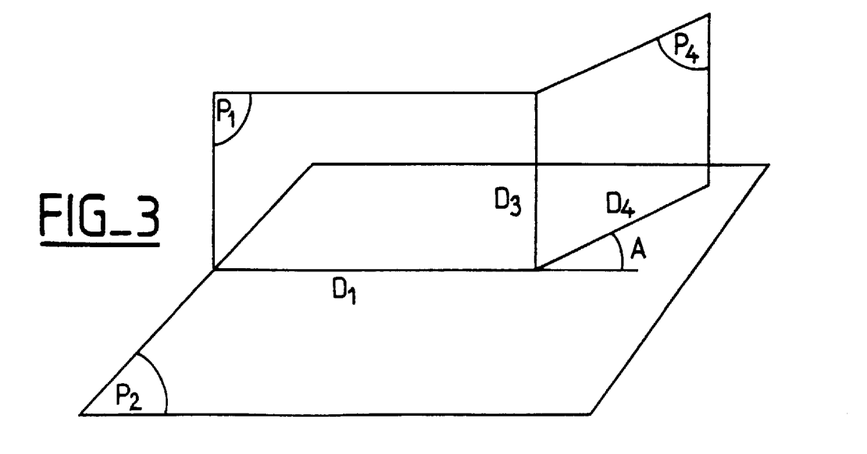
FIG. 3 is a geometrical diagram showing the structure of the tool from FIG. 2.

In the embodiment shown in FIGS. 2 and 3, the two straight line segments D1, D4 respectively constituting the intersection of the holding plane P1, on the one hand, the cutting plane P4, on the other hand, and the plane P2 containing said median axis D1 and perpendicular to the holding plane P1 define between them a lateral inclination angle A.

The position 8a that the cutting member 8 would occupy in a conventional tool is shown in dashed outline.

In FIGS. 2 and 3 the holding plane P1 is shown as a vertical plane; in this example the median axis D1 is horizontal, and likewise the plane P2.

It can be seen that the cutting plane P4 has been pivoted relative to the plane P1 about the vertical D3. In the simple situation shown, the lateral inclination angle A can be measured in the horizontal plane P2.

Figure 5:
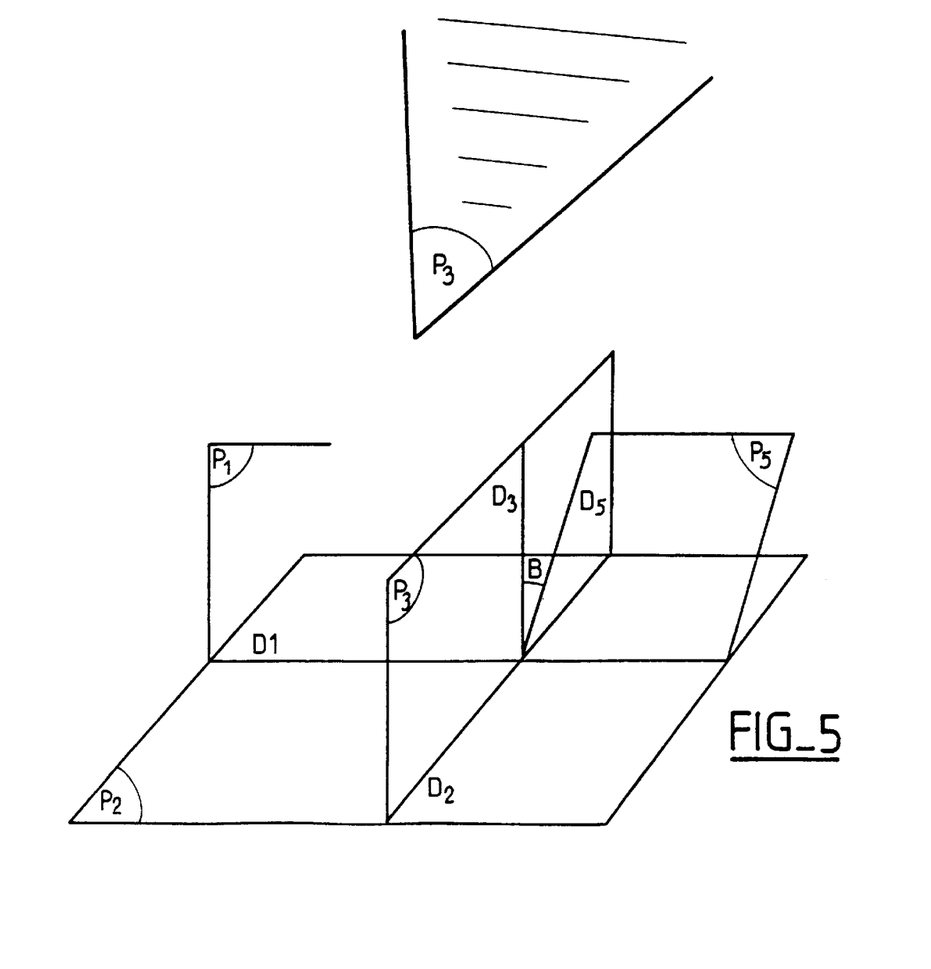
FIG. 5 is a view equivalent to FIG. 3 showing the tool from FIG. 4.

In the embodiment shown in FIGS. 4 and 5, the two straight line segments D3, D5 respectively constituting the intersection of the holding plane P1, on the one hand, the cutting plane P5, on the other hand, and a plane P3 perpendicular to said median axis D1 of the members 5, 6 forming handles define between them an inclination angle B in a frontal plane P3.

The position 8b that the cutting member 8 would occupy in a conventional tool with no inclination of the cutting plane is shown in dashed outline.

Likewise, the holding plane P1 is shown as a vertical plane.

It can be seen that the cutting plane P5 has been pivoted relative to the plane P1 about the line segment D1. In the simple case shown, the inclination angle B in the frontal plane can be measured in the frontal plane P3.

Surprisingly, each of the two inclinations just described improves the cutting position of the tool relative to a conventional cutting tool, reduces the muscular effort required for a cutting operation, and makes a cutting operation simpler and more efficient.

Of course, either of these two inclinations can be used in a cutting tool, but it is also possible to combine these two inclinations in the same tool.

Figure 7:
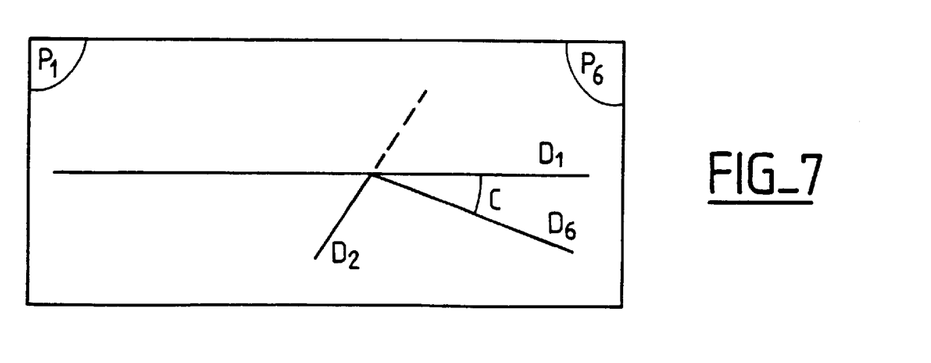
FIG. 7 is a view equivalent to FIG. 3 showing the tool from FIG. 6.

In the embodiment shown in FIGS. 6 and 7, the projection D6 of a median axis D7 of the cutting edges 9, 10 onto the holding plane P1 defines with the median axis D1 of the members 5, 6 forming handles an inclination angle C in the holding plane.

The position 8c that the cutting member would occupy in a conventional cutting tool is shown in dashed outline.

Likewise, the holding plane P1 is shown as a vertical plane.

In the simple case shown, and in the absence of any other inclination, the cutting plane P6 is coincident with the plane P1 and the median axis D7 of the cutting edges 9, 10 is in this plane P1 and is therefore coincident with its projection D6 onto the plane P1.

It can be seen that D6 has simply been pivoted relative to D1 about the straight line segment D2, in the downwards direction from the point of view of a user holding the tool.

This angle C of inclination in the holding plane can be measured in the vertical plane P1.

This inclination C can be used in combination with either or both of the two inclinations A and B previously referred to.

Figure 8:
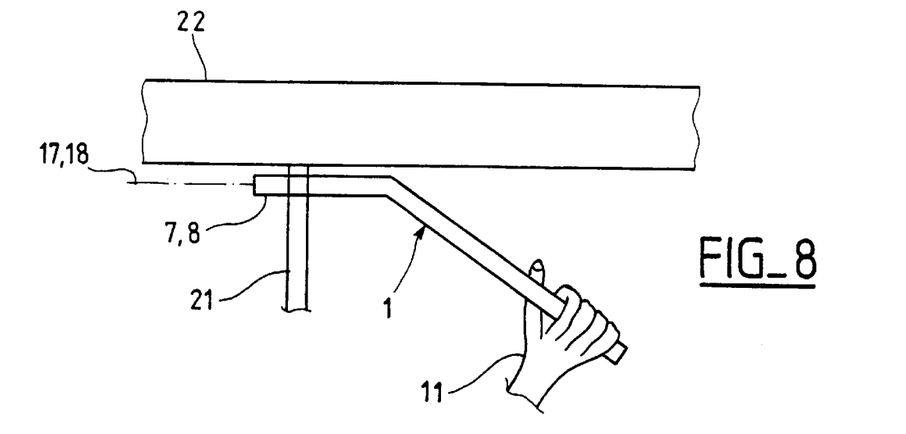
FIG. 8 is a diagrammatic top view of the tool from FIG. 2 in use.

FIG. 8 is a diagrammatic representation of the embodiment of the tool from FIGS. 2 and 3. This tool is a tool for a right-handed person, held in a right hand 11.

It can be seen that to cut a secondary branch 21 off a main branch 22 which is to remain, the tool has an excellent cutting position, the hand is in a natural position that is not likely to cause pain or pathological conditions, and the hand and the fingers of the user are removed from the working area and cannot be impeded or injured by the branches 21, 22.

In this tool for a right-handed person, the cutting plane P4 is inclined relative to the holding plane P1 towards the left-hand side of the user of the tool.

FIG. 9 shows a tool in which the cutting edges 9, 10 are curved. It is only near their free end 15, 16 remote from the pivot axis 4 that these cutting edges can be regarded as equivalent to straight line segments 17, 18.

The embodiment of the tool from FIGS. 2 and 3 can be adapted for actuation by a right-handed person or by a left-handed person. In this case, the intersection D4 of the cutting plane P4 and of said plane P2 perpendicular to the holding plane P1 and containing the median axis D1 of the members 5, 6 forming handles is inclined relative to said median axis D1, either towards the right-hand side or towards the left-hand side of a user of the tool 1, according to whether the tool 1 is a tool for a left-handed person or a tool for a right-handed person.

Figures 10, 11:
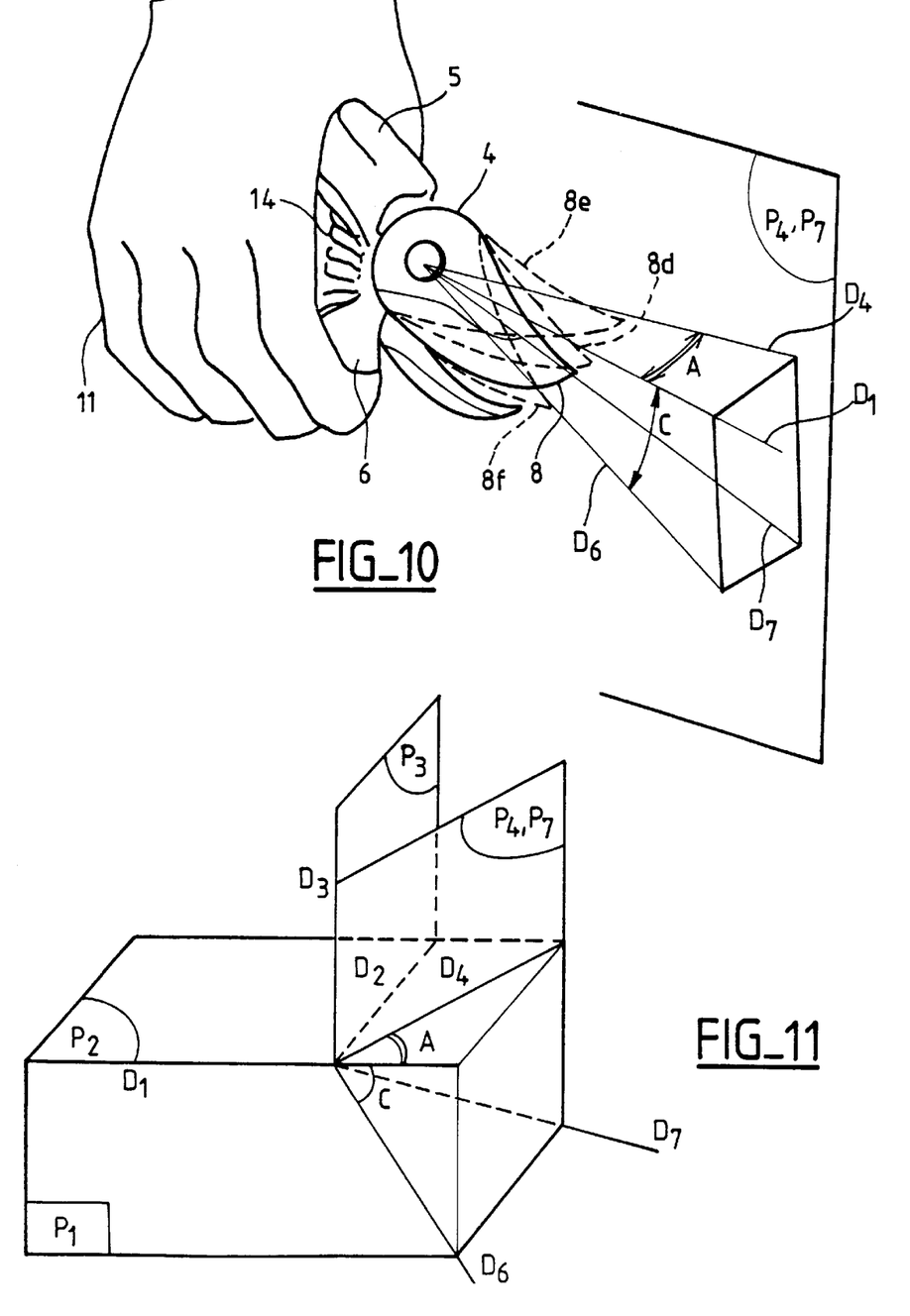
FIG. 10 is a view equivalent to FIG. 6 of one embodiment of the present invention.
FIG. 11 is a view equivalent to FIG. 3 showing the tool from FIG. 10.

In the embodiment of FIGS. 10 and 11, the median axis D7 of the cutting edges is contained in a cutting plane P7 which is coincident with the cutting plane P4 of FIGS. 2 and 3.

The plane P7 intersects the plane P2 along the straight line segment D4 which is the projection of D7 onto the plane P2 parallel to D3.

As seen for the embodiment of FIGS. 2 and 3, the straight line segments D1 and D4 define between them a lateral inclination angle A, D4 being inclined relative to D1 in the anticlockwise direction in the embodiment shown, which corresponds to a tool for a right-handed person.

Moreover, and as in the simple case shown diagrammatically in FIG. 7, the projection D6 of D7 onto the holding plane P1 parallel to D2 defines with D1 an angle C of inclination in the holding plane.

The position of the cutting member 8 having these two inclinations A and C is shown in full outline in FIG. 10. The positions 8d, 8e and 8f of this cutting member respectively with no inclination, with the lateral inclination A only and with the inclination C in the sagittal plane only are also shown in this figure, in dashed outline.

In this tool, the lateral inclination angle A, which is towards the left-hand side for a right-handed person and vice versa, is advantageously between 5° and 40°, preferably between 5° and 15°.

In this same tool, the inclination angle C in the holding plane is advantageously between 5° and 50°, preferably between 10° and 30°, this inclination being in the downwards direction.

Our systematic tests have shown that the combination of a lateral inclination angle and an inclination angle in the holding plane has an unexpected and surprising synergetic effect.

In a first series of tests we tested seven secateurs numbered 1 through 7. The secateurs 1 had no inclination of the median axis of the cutting edges relative to the median axis of the handles.

The secateurs 2 through 4 each had a different lateral inclination angle towards the left-hand side. The secateurs 5 through 7 each had a different downwards inclination in the holding plane.

For each secateurs we measured the mean angle of bending of the wrist and the mean angle of inclination of the wrist. The bending of the wrist is the downward pivoting movement about the horizontal transverse axis of the wrist when the hand is laid flat on a horizontal plane. The pivoting movement of the wrist upwards about the same horizontal transverse axis is called extension of the wrist. The deviation of the wrist is the pivoting movement about a median vertical axis of the wrist, towards the right or towards the left, the hand remaining on the horizontal plane. For the right hand, deviation towards the right is called cubital deviation and deviation towards the left is called radial deviation.

For each secateurs we also measured a mean relative cutting speed in the form of a dimensionless decimal number defined as the ratio between a predetermined time representing a mean standard time for one cut and a mean time for one cut effected with one of the secateurs 1 through 7 tested.

The results obtained are summarized in the table below and illustrated in FIGS. 12 through 16.

| Secateurs | Lateral inclination A to left (degrees) | Downward inclination C (degrees) | Mean wrist bending angle (degrees) | Mean wrist deviation angle (degrees) | Mean cutting speed |
| --- | --- | --- | --- | --- | --- |
| 1 | 0 | 0 | 32.34 | 6.53 | 0.64 |
| 2 | 5 | 0 | 38.09 | 7.38 | 0.82 |
| 3 | 10 | 0 | 36.25 | 3.12 | 0.71 |
| 4 | 20 | 0 | 28.68 | 1.42 | 0.83 |
| 5 | 0 | 20 | 38.76 | 0.79 | 0.34 |
| 6 | 0 | 30 | 33.9 | 1.54 | 0.57 |
| 7 | 0 | 40 | 42.17 | 1.53 | 0.60 |

It is clear that bending and deviation of the wrist are reduced for secateurs having an inclination of the blade towards the left and that deviation of the wrist is reduced for secateurs having some downward inclination of the blade. These results are satisfactory in that these positions give rise to syndromes and pathological conditions of the muscles and the bones.

Figure 12:
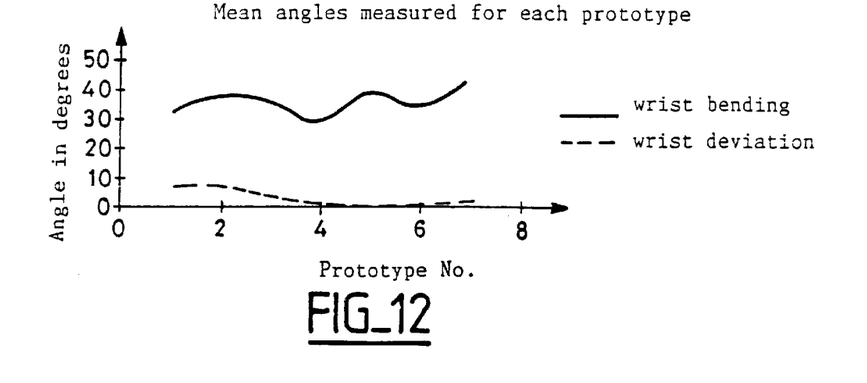
FIGS. 12 through 14 are curves indicating the mean angle of bending of the wrist and the mean angle of deviation of the wrist for different values and different directions of inclination of the cutting members.
Figure 13:
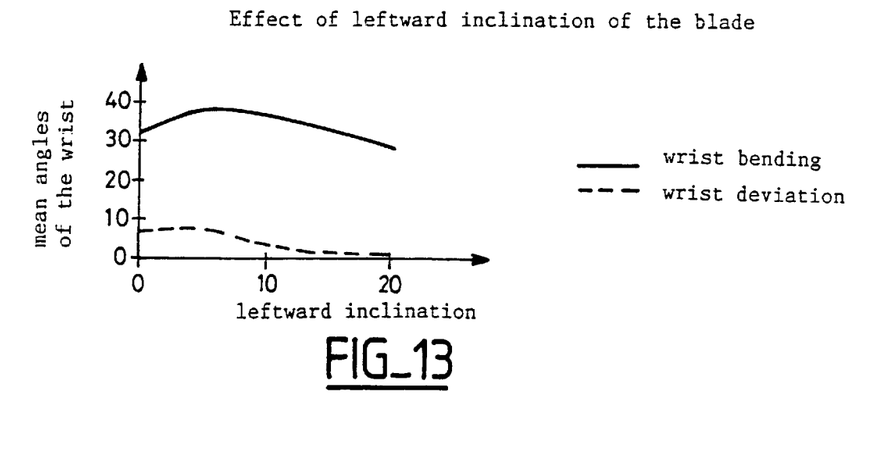
Figure 14:
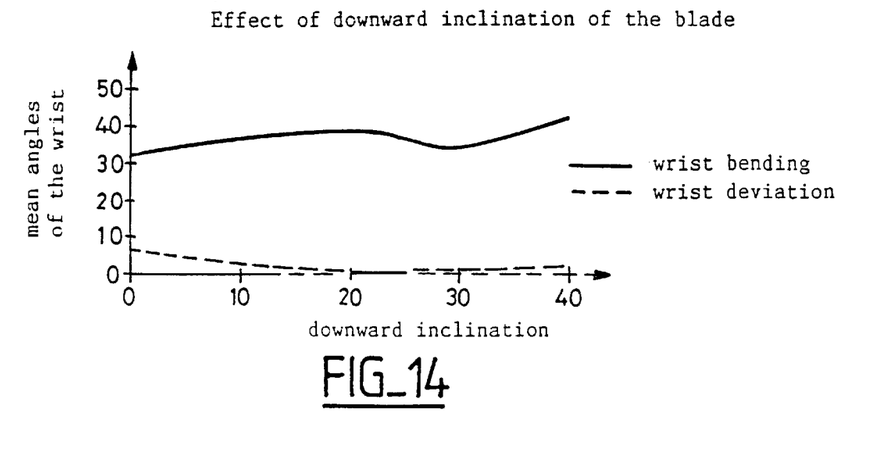

Note also that the leftward inclination of the secateurs has a combined effect on bending and deviation of the wrist and that the vertical downwards inclination of the blade (in a range of angles from 20° through 30°) reduces the deviation of the wrist and does not generate any greater bending than the secateurs 1 with no inclination.

Figure 15:
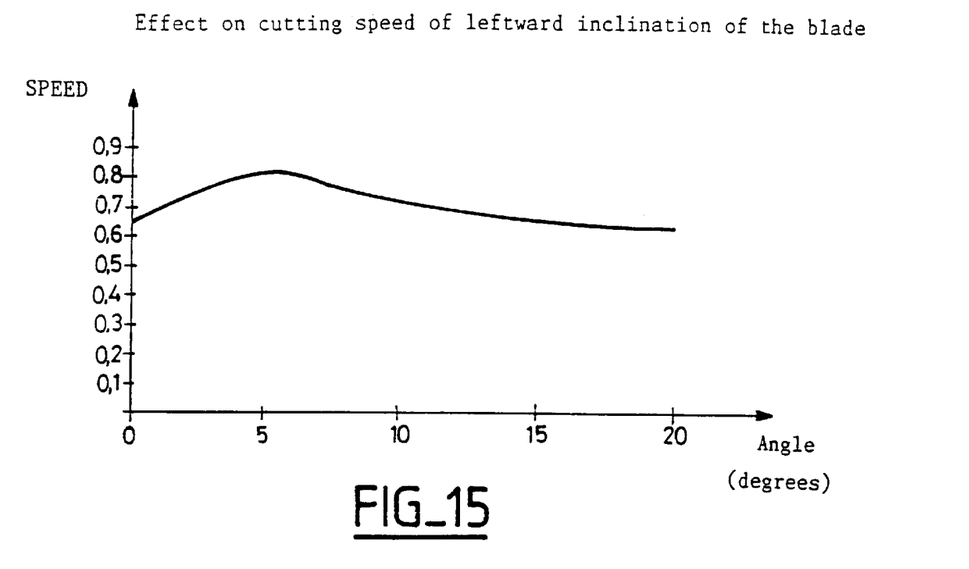
FIGS. 15 and 16 are curves showing the influence of the inclination of the cutting members on the cutting speed.
Figure 16:
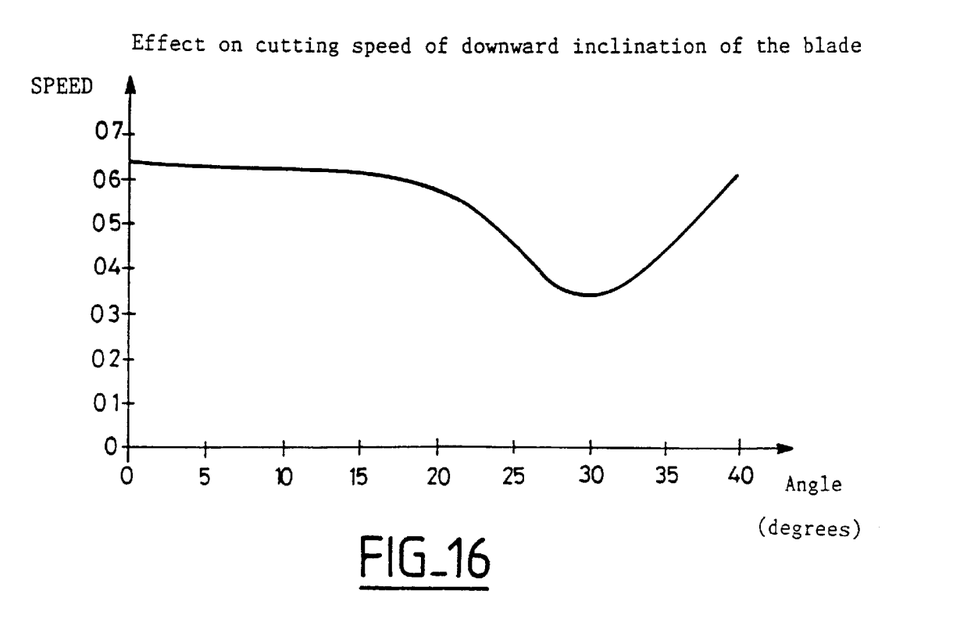

Another interesting result is that the lateral inclination of the blade increases the speed of use of the secateurs and counterbalances the slowing down due to the downward inclination of the blade (which slowing down incidentally disappears after a short period of adjustment, in the order of one hour).

These results show the benefit of combining in one and the same secateurs a lateral inclination and a downward inclination of the blade.

We undertook further systematic tests to show the synergetic effect obtained by combining these two inclinations in one and the same secateurs, by comparison with conventional secateurs with no inclination.

The first tests showed that the percentages of the cutting time with the wrist extended with a high extension angle, greater than 20°, were comparable for both tools and for thin wood (diameter less than 20 mm), in the order of about 30%, and were slightly greater for the tool with two inclinations in the case of thick wood.

The extended positions were not those generating the most syndromes and pathological conditions.

The percentage of the time with the wrist bent changed from about 30%, for the conventional secateurs, to values for the secateurs with two inclinations in the order of 20% for thin wood and 10% for thick wood, for which the wrist is most heavily loaded and fatigued.

Likewise, the percentage of the cutting time with the wrist in cubital deviation was reduced for the secateurs with two inclinations, respectively by around 25% for thick wood and by around 40% for thin wood.

All of the foregoing shows that the combination in one and the same tool of a lateral inclination A and an inclination C in the sagittal plane combines and enhances the respective advantages of these two inclinations, whilst limiting or reducing their disadvantages.

In a variant that is not shown, the tool is further designed so that the cutting plane is at an inclination angle B in the frontal plane P3 to the holding plane P1. This improvement increases comfort in some uses of the tool, in particular for cutting a substantially horizontal branch.

The cutting tool is advantageously configured so that the positions of the holding areas 12, 13 of the handles 5, 6 in the open and closed positions of the tool respectively correspond substantially to the about two-thirds open and about one-third open positions of the hand of a user.

It is known that users of secateurs develop the maximum force with the minimum fatigue and risk between these two one-third open and two-thirds open positions.

Similarly, using the tool is facilitated if the bottom part 6a of the bottom handle 6 has a substantially semicircular section.

Figure 17:
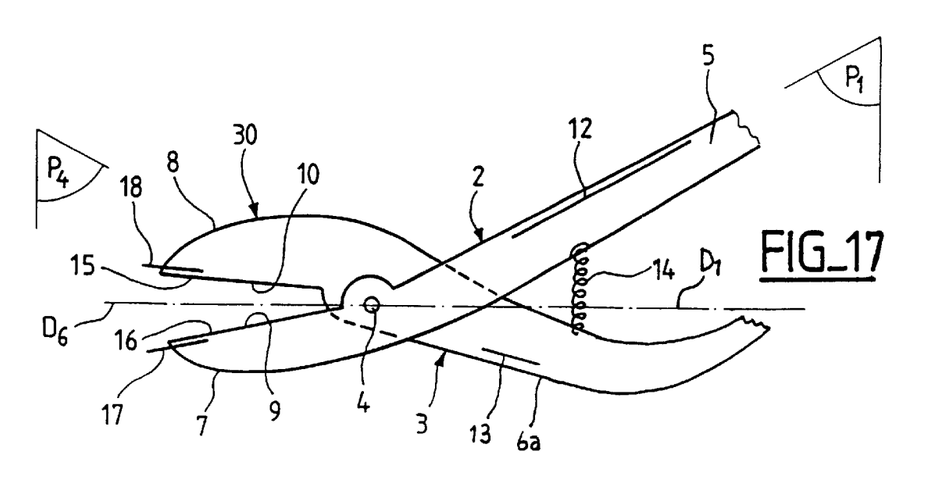
FIG. 17 is a view equivalent to FIG. 1 showing a bottom holding element with a substantially semicircular section.

As seen in FIG. 17, shape enables the fingers to slide on this bottom part which acts like a rotating handle and provides local massage, avoiding local compression of the blood vessels and the tendons likely to lead to numbing of the fingers.

The top part of the top handle is also given a particular curved shape so that the handle does not bear against the region of the carpal canal of the hand holding the tool.

In all of the foregoing the inclination of the holding members and the active cutting members relative to each other can be achieved at the level of the active cutting members (bent or cranked active members), at the junction between the active cutting members and the holding members (for example: inclined fixing), or at the level of the holding members (for example: twisted handles).

Depending on the type of tool, the values of the inclination angles can be fixed by the design of the tool or the tool can include means for enabling a user to adjust these values at will.

Furthermore, it is always a simple matter to determine the median axis D1 of the members 5, 6 forming handles, in particular from the positions of these members 5, 6 in the closed position of the tool 30. The median axis D1 of the handle members 5, 6 is a line which is located centrally between the two equivalently straight line segments 12, 13 that are respectively substantially coincident with the top edge of the top handle 5 and the bottom edge of the bottom handle 6. The median axis D1 is easily determinable when the members 5, 6 forming the handles are in the closed position due to their proximity to each other.

The same goes for the median axis D6 or D7 of the cutting edges 9, 10, from the positions of these edges 9, 10 in the closed position of the tool 30. The median axis D6 or D7 of the cutting edges 9, 10 is a centrally located line that extends through the pivot axis 4 and which is located centrally between two straight line segments, each formed by the line segment between the pivot axis 4 and a point substantially located at the free end of a respective cutting edge 9, 10. When the free ends of the cutting edges are substantially coincident because the handles 5, 6 are in a closed position, the median axis D6 or D7 is easily determinable because it is the line between the pivot axis 4 and the coinciding free ends of the cutting edges 9, 10.

For each type of tool, the value of each inclination is obviously adapted to suit the structure and the shape of the tool and its components.

A cutting tool of the secateurs type has been described that is particularly well matched to the morphology and to the anatomy of the hand of a user and the structure and the shape of which are ergonomically designed to facilitate the work and to improve the conditions of use of the tool.

Of course, the present invention is not limited to the embodiments that have just been described and many changes and modifications may be made to these without departing from the scope of the invention.

Accordingly, the invention also applies to secateurs featuring electronic, electrical, hydraulic or pneumatic assistance.

There is claimed:

1. A secateurs for cutting thin and thick wood comprising two arms pivoting relative to each other about a pivot axis, a spring biasing said arms with respect to each other, said two arms each including on the same side of said pivot axis a handle member having a holding area, wherein each of said two handle members are biased away from each other by the spring, and on the other side of said pivot axis a cutting member having a cutting edge, said two handle members being adapted to be held in one hand by a user in said respective holding areas equivalent to straight line segments mobile relative to each other substantially in a holding plane when said two handle members are moved towards each other against the action of said spring to actuate said secateurs and when said two handle members are released thereby opening said cutting edges of said secateurs, said cutting edges of said cutting members being equivalent, at least near their free end remote from said pivot axis, to straight line segments mobile relative to each other substantially in a cutting plane when said tool is actuated, said holding plane containing a median axis of said handle members, two straight line segments respectively constituting intersections of said holding plane, on the one hand, of said cutting plane, on the other hand, with a plane containing said median axis and perpendicular to said holding plane, defining between them a lateral inclination displacement angle, wherein a projection of a median axis of said cutting edges onto said holding plane defines with said median axis of said handle members a displacement angle of inclination in the holding plane, said displacement angle of inclination being arranged downwardly from said median axis of said handle members when watching the palm of a user of the secateurs.

2. The secateurs claimed in claim 1 wherein said lateral inclination displacement angle has a value between 5° and 40°.

3. The secateurs claimed in claim 1 wherein said displacement angle of inclination in said holding plane has a value between 5° and 50°.

4. The secateurs as claimed in claim 1 adapted to be actuated either by a right-handed person or by a left-handed person wherein the intersection of said cutting plane and said plane perpendicular to said holding plane and containing said median axis of said members forming handles is inclined relative to said median axis either towards the right-hand side or towards the left-hand side of a user of the tool, according to whether the tool is a tool for a left-handed person or a right-handed person.

5. The secateurs as claimed in claim 1 wherein said cutting plane is inclined relative to said holding plane at an inclination angle in the frontal plane.

6. The secateurs as claimed in claim 1 configured so that the positions of holding areas of said handles in open and closed positions of said tool respectively correspond substantially to the two-thirds open and one-third open positions of the hand of a user.

7. The secateurs as claimed in claim 1 wherein a bottom part of a bottom handle has a substantially semicircular section.

8. The secateurs as claimed in claim 2 wherein said lateral inclination displacement angle has a value between 5° and 15°.

9. The secateurs as claimed in claim 3 wherein said displacement angle of inclination in said holding plane has a value between 10° and 30°.

10. The secateurs as claimed in claim 1 wherein said lateral inclination displacement angle has a value between 5° and 15° and said displacement angle of inclination in said holding plane has a value between 10° and 30°.

11. The secateurs as claimed in claim 1 wherein said cutting plane is laterally displaced with respect to the holding plane in a direction away from the palm of the hand of a user of said secateurs.

12. The secateurs as claimed in claim 1 wherein said two handle members include a top handle member and a bottom handle member, said holding areas of said handle members being sized and shaped such that a user of the secateurs actuates the secateurs with his hand by surrounding the bottom handle member with four fingers of the hand and surrounding the top handle with the thumb of the hand.

\* \* \* \* \*